United States Patent [19]
Lock et al.

[11] Patent Number: 5,325,612
[45] Date of Patent: Jul. 5, 1994

[54] SHOE WITH IMPROVED DUAL HARDNESS HEEL-LIFT

[75] Inventors: Barry W. Lock, Washington; William J. Scholl, St. Louis, both of Mo.

[73] Assignee: Nine West Group, Inc., St. Louis, Mo.

[21] Appl. No.: 79,066

[22] Filed: Jun. 16, 1993

Related U.S. Application Data

[63] Continuation of Ser. No. 842,015, Feb. 25, 1992, which is a continuation-in-part of Ser. No. 555,079, Jul. 18, 1990, abandoned, which is a continuation-in-part of Ser. No. 482,249, Feb. 20, 1990, abandoned.

[51] Int. Cl.$^5$ .............................................. A43B 21/00
[52] U.S. Cl. ................................... 36/34 R; 36/34 A
[58] Field of Search ............... 36/34 R, 35 R, 35 A, 36/36 R, 36 A, 34 A

[56] References Cited

U.S. PATENT DOCUMENTS

| | | | |
|---|---|---|---|
| 2,908,089 | 10/1959 | Ciaio | 36/36 R |
| 2,932,098 | 4/1960 | Lange | 36/34 R |
| 2,990,627 | 7/1961 | Stubbe | 36/35 R |
| 3,034,234 | 5/1962 | Portelli | 36/36 R |
| 3,035,358 | 5/1962 | Ross | 36/36 R |
| 3,144,722 | 8/1964 | Cortina | 36/36 R |
| 3,174,235 | 3/1965 | Johnston | 36/36 R |
| 3,216,133 | 11/1965 | Houle | 36/36 P |
| 3,261,115 | 7/1966 | Manze | 36/34 R |
| 3,268,643 | 8/1966 | Katzenmeyer . | |
| 4,345,058 | 8/1982 | Dettling | 36/35 R X |
| 4,922,629 | 5/1990 | Bouchet | 36/34 R X |

FOREIGN PATENT DOCUMENTS

| | | | |
|---|---|---|---|
| 239681 | 7/1962 | Austria | 36/35 R |
| 1176647 | 6/1957 | France | 36/36 R |
| 1174906 | 3/1959 | France | 36/34 A |
| 1174907 | 3/1959 | France | 36/34 A |
| 74377 | 11/1960 | France | 36/34 A |
| 75287 | 4/1961 | France | 36/34 A |
| 1280676 | 11/1961 | France | 36/34 A |
| 410461 | 8/1932 | United Kingdom | 36/32 R |

*Primary Examiner*—Paul T. Sewell
*Assistant Examiner*—BethAnne C. Cicconi

[57] ABSTRACT

The present invention relates to a shoe having an improved unitary dual hardness dowel-lift with superior wear and non-slip characteristics. The dual hardness dowel-lift includes a hard polyurethane top portion and a soft polyurethane bottom portion. The bottom portion is cast onto the top portion. The bottom portion is a softer material which possesses a hardness lower than the top portion as measured by the Shore A Hardness test, and preferably is a thermoset polyurethane elastomer.

22 Claims, 2 Drawing Sheets

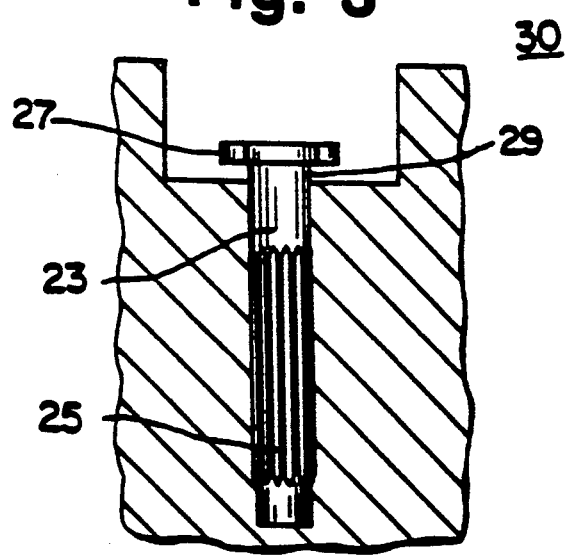

SHOE WITH IMPROVED DUAL HARDNESS HEEL-LIFT

This application is a continuation of our co-pending U.S. application Ser. No. 842,015 filed Feb. 25, 1992, which is a continuation in part of International Application No. PCT/US91/01014, International Publication No. WO 91/12741, published 5 September, 1991, filed 14 February, 1991, which is a continuation in part of U.S. application Ser. No. 555,079, filed Jul. 18, 1990, now abandoned, which is a continuation in part of U.S. application Ser. No. 482,249, filed Feb. 20, 1990, now abandoned.

TECHNICAL FIELD

The invention relates to women's casual and dress shoes, but does not relate to athletic shoes. The invention focuses on the heel-lift and more particularly on a dowel-lift. This invention also relates to a method of making a dowel-lift.

BACKGROUND ART

A heel-lift is disposed at the end of the heel and makes contact with the walking surface. A heel-lift can be used on a wide variety of shoes, including men's shoes. A dowel-lift is a heel-lift used on women's shoes having at lest a slightly elevated heel. The dowel-lift is molded around a pin or dowel which typically is metal. The dowel projects outward and upward from the dowel-lift. The dowel is driven into the bottom of the heel of the shoe.

For the comfort and safety of the wearer, it is important that the heel-lift have good cushioning and non-slip characteristics. The heel-lift should also have good wear characteristics to extend the life of the shoe.

Prior art dowel-lifts are constructed of a metal dowel and a material having a single hardness, typically a hard thermoplastic polyurethane resin. The hard thermoplastic polyurethane dowel-lift caps off the main part of the heel of the shoe and prevents that main part from being destroyed during normal use.

Hard thermoplastic polyurethane dowel-lifts have several drawbacks. First, the hard thermoplastic polyurethane dowel-lift creates a loud noise when striking a hard walking surface, thereby causing embarrassment to wearers. Moreover, the hard thermoplastic polyurethane has inferior non-slip characteristics. Such inferior non-slip characteristics can result in accidents with injury to the user. Shoe manufacturers have been, and continue to be, involved in numerous lawsuits for damages due to such injuries. Finally, the hard thermoplastic polyurethane has poor wear resistance. Generally, persons in the industry accept that dowel-lifts frequently will need replacement due to wear. In fact, it is a common practice in the industry to include a replacement set of dowel-lifts in the original shoe box so that the woman can replace the dowel lift when worn out.

Another problem with the conventional hard thermoplastic polyurethane has Seen the undesired disengagement of the polyurethane from the metal dowel. Such disengagement can occur when the user pivots on the heel.

Persons in this art have accepted the inferior product because of supposed molding constraints. Persons looked only to conventional hard materials which could be injection molded around a metal dowel. For that reason they accepted the inferior performance characteristics of the hard thermoplastic polyurethane dowel-lifts. The use of the hard material insured that the material adhered to the dowel. It was generally believed that other materials would be inappropriate. Other materials were though to be difficult to adhere to the metal dowel.

Further, the prior art taught that if a soft material was used to contact the walking surface, it was desirable, indeed even necessary, that such softer material be provided in a replaceable form. This was based upon the general belief in the prior art that such softer materials had inferior wear characteristics. Thus, the prior art focussed on the ability to rapidly replace the walking surface contacting piece of a heel lift. See, e.g., French Patent 1,176,647 dated 14 April 1959 to Plouviez.

DISCLOSURE OF THE INVENTION

Accordingly, the present invention provides a new dowel-lift which has better performance characteristics than the prior dowel-lifts. The invention provides a quieter dowel-lift with a combination of better non-slip characteristics and better wear characteristics. The invention provides a unitary dowel-lift having a harder upper portion molded to the dowel and a softer portion for contacting the walking surface. The two portions are secured together as a unitary product by a new molding method which provides direct adhesion without the use of any auxiliary fastening means or added adhesive means.

This unique unitary dual hardness heel-lift overcomes the drawbacks of prior art heel-lifts. The present invention provides a unitary dowel-lift which is quieter than conventional prior art dowel-lifts and provides a combination of better wear resistance and better non-slip characteristics. Moreover the dual hardness heel-lift does not sacrifice the benefits of the conventional polyurethane top-lifts.

Applicant's invention involves a unitary dowel-lift with two portions. The first portion, which adheres to the dowel and provides what is essentially a substrate for the second portion, is made of a harder material. The harder material can be the thermoplastic polyurethane of a conventional dowel-lift or a hard thermoset polyurethane elastomer. The second portion, which contacts the walking surface in use, is made of a softer material, such as a thermoset polyurethane elastomer or a softer thermoplastic polyurethane. These two portions are molded together in a method which bonds the two portions to form a unitary dowel-lift. This is to be contrasted from a multi-part heel-lift with distinct pieces which are merely secured together by use of an auxiliary fastening means such as nails, staples, glue-like adhesives, etc.

In the present invention, a hard polyurethane material is molded to a metal dowel pin forming the first portion of the dowel-lift. Preferably, a thermoset material is used for the hard material. After the hard thermoset polyurethane material partially gels, but before it is completely cured, the softer thermoset material which creates the second, walking surface contacting, portion is cast onto the hard material.

The harder portion secures better to the dowel pin than the softer material would secure. The softer portion of the dowel-lift which contacts the walking surface is quieter than the hard polyurethane, has better non-slip characteristics, and provides better cushion. The combination of the two portions results in a unitary dowel-lift with better performance characteristics than the hard polyurethane. Surprisingly, the inventors have discovered that although a softer material contacts the walking surface, the unitary dual-hardness dowel-lift of this invention has superior wear characteristics contrary to the belief in the prior art that if such a soft material contacted the walking surface, the soft material would necessarily wear rapidly.

BRIEF DESCRIPTION OF DRAWINGS

FIG. 3 is a cross-sectional view of a mold used for making the dowel lift of FIG. 2.

MODES FOR CARRYING OUT THE INVENTION

Figure 1:
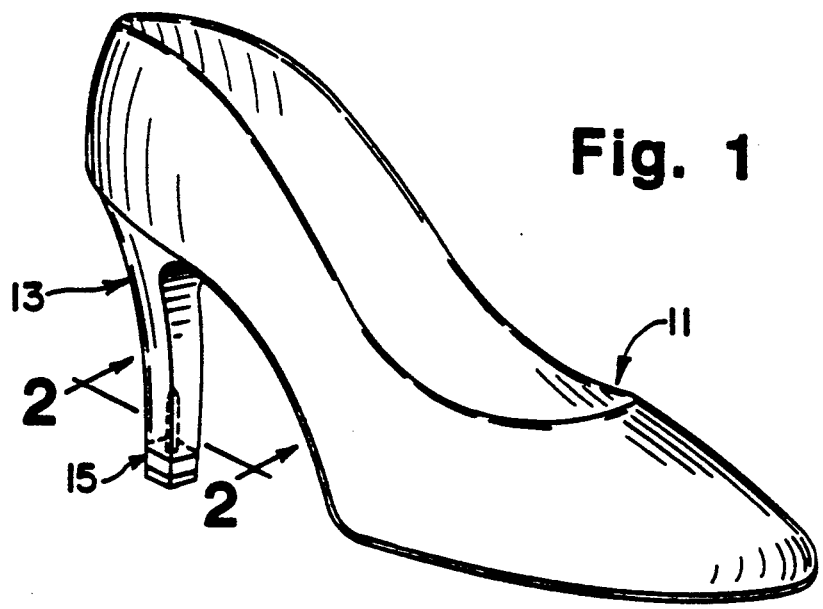
FIG. 1 is a perspective view of the shoe of our invention.

Turning first to FIG. 1, there is shown a perspective view of a shoe 11 constructed in accordance with one embodiment of this invention. The shoe includes a high-heel 13 with a unitary dual-hardness dowel-lift 15 at the bottom of the heel.

Figure 2:
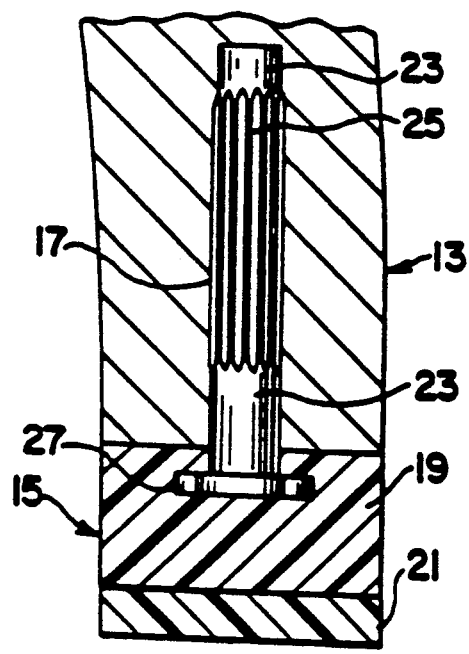
FIG. 2 is a partial cross-sectional view along line 2—2 of FIG. 1.

Referring to FIG. 2, there is shown an enlarged cross-sectional view of the bottom of the heel 13 and the unitary dual-hardness dowel-lift 15. The dowel-lift 15 includes a metal dowel or pin 17, a molded first harder portion 19 secured to the dowel 17 and a second softer portion 21 bonded to the first portion 19 with the bottom of second portion 21 contacting the walking surface. The softer second portion 21 along with the harder portion 19 are portions of the unitary dowel-lift 15 and are molded together by a method which bonds the two portions together by direct adhesion without the use of any separate adhesive means such as glue or other compounds or other auxiliary fastening means such as staples or nails between the hard polyurethane material 19 and the soft polyurethane 21.

The metal dowel 17 is substantially cylindrical in shape. It includes a shaft section 23. The shaft section 23 includes a series of grooves 25. The grooves 25 grip the heel 13 when the dowel 17 is driven into the heel. The bottom of the dowel 17 includes a horizontal flanged portion 27.

As shown in FIGS. 2 and 3, the hard portion 19 is molded to metal dowel 17 in mold 30. The metal dowel should be prepared prior to molding the first portion 19 onto the dowel. Preparation of the metal can include a grit blast or a sand blast. One also can wash the dowel with a suitable solvent. One can then apply a suitable adhesive to the dowel. The adhesive should be one that bonds a thermoset polyurethane to metal substrates. Many such suitable adhesives are known and available. The adhesive is applied to the flanged portion 27 and the bottom segment 29 of shaft section 23 which will be surrounded by the first portion 19. Such an adhesive improves the adherence of the first portion 19 to the metal dowel 17. Improving the adherence of the first portion 19 to the metal dowel 17 allows one to use a somewhat softer material for the first portion 19.

The first portion 19 is made from a hard polyurethane material such as a cast thermoset polyurethane material. The material possesses an ultimate Shore A Hardness of greater than or equal to 96, and preferably 97 and includes materials with an ultimate Shore A Hardness of about 100 or more. The first portion 19 is molded around the bottom of the dowel 17, specifically around flange 27 and the bottom segment 29 of shaft 23 of dowel 17, by casting the material. The first portion completely surrounds the flange 27 and the bottom segment 29 of shaft 23. The flange 27 and the adhesive thus operate to support the first portion 19 on the dowel.

The hard thermoset polyurethane cast as first portion 19 is allowed to achieve an adequate partial gel, but not completely cure. By adequate partial gel, we mean that the material will harden to less than 80% of its ultimate hardness as measured by the Shore A Hardness, and preferably between about 40 to 60% of its ultimate hardness. This partial gel typically occurs within three to ten minutes. However, one can add a catalyst so that the material achieves the partial gel within a much shorter time.

When the hard thermoset material forming the first portion 19 has reached its adequate partial gel, the thermoset polyurethane is added to the mold 30 to form the second portion 21. By forming the second portion 21 when the material of the first portion 19 is at its adequate partial gel, first portion 19 and second portion 21 are bonded into the unitary dual-hardness heel-lift of the invention.

The material used for the second portion 21 is softer than the material used for the first portion 19. The material for the second portion 21 possesses ultimate Shore A Hardness values preferably less than 96, and most preferably less than 93. The Shore A Hardness of the second portion 21 is preferably greater than 79, and most preferably greater than 82. The most preferred Shore A Hardness is about 92 for the second portion 21.

The material for the second portion 21 further possesses a rebound resilience of greater than 40%, and most preferably greater than 50.0%. The rebound resilience is measured by the ASTM test procedure "Resilience by Vertical Rebound," D-2632-88.

The material for the second portion 21 also possesses superior abrasion properties. The NBS Abrasion test provides measurement of abrasion properties. The NBS Abrasion test is ASTM procedure D1630, RMA HS-2. As measured by that procedure, the material possesses a NBS Abrasion greater than 350, and most preferably between 390 and 480.

The second portion 21 is preferably made from a cast thermoset polyurethane elastomer. The thermoset polyurethane elastomer materials are readily available in the industry. Such material can be made by mixing a polyisocyanate with a polyol, such as a polyhydric polyether, and a curative. A typical curative could be a diamine curative. The term polyurethane elastomer would include polyurethane having polyurea.

The second portion 21 could be made from other materials. However, the materials must be softer than the first portion 19. For example, a thermoplastic polyurethane having Shore A Hardness less than 100 could be utilized. The soft thermoplastic polyurethane can be made from the reaction of an isocyanate with either a polyester polyol or a polyether polyol. One can use an isocyanate such as methylenediphenyl isocyanate or tolylene diisocyanate.

The second portion 21 is thin. The portion is generally less than about 4 millimeters in vertical height. Preferably, the material is less than or equal to 2.5 millimeters in height. The embodiment shown in FIG. 2 is about 2 millimeters in height. The first portion 19 is about 4 millimeters in height in the embodiment of FIG. 2.

The second portion 21 is cast onto the surface of the partially gelled first portion 19. The second portion 21 thus bonds directly to the surface of the first portion 19. The entire top surface of second portion 21 bonds to the entire bottom surface of first portion 19.

One can obtain suitable polyurethane molds and starting materials, such as polyisocyanates, polyols, and curatives, through polyurethane molders in the industry. One such mold is Flexible Industries of Burlington, Iowa.

After the second portion 21 is bonded to the first portion 19 to complete the unitary dowel-lift 15, the completed dowel lift is removed from the mold 30. After manufacture, the dowel 17 of the dowel lift 15 is driven into the bottom of the heel 13. This dowel-lift results in a quieter shoe with better wear characteristics and non-slip characteristics.

The first portion 19 also could be an injection molded thermoplastic polyurethane with an ultimate Shore A Hardness of about 100. In such a case, the first portion 19 is injection molded onto the dowel 17. One surface of the first portion 19 is then prepared by abrading the surface or applying a solvent. The first portion 19 is then transferred to a second mold where the thermoset polyurethane elastomer 21 is cast onto the prepared surface of the first portion 19. In this alternate embodiment, once again the material bond together in the absence of any auxiliary fastening means.

From the foregoing, it will be seen that there has been brought to the art a new and improved shoe which overcomes many of the drawbacks and problems of the prior art. In particular, the shoe of the invention provides a dowel-lift which is softer. Therefore this shoe invention provides a quieter shoe as the heel strikes the walking surface. The dowel-lift is also more wear resistant and has better non-slip characteristics.

The dowel-lift of this invention is most preferably used in women's heeled shoes. Such women's shoes have heels typically equal to or greater than one inch in height. Women's formal dress shoes are typically two inches or greater. Preferably, the dowel-lift of this invention is used on heels which are equal to or less than 1.0 sq. in. in horizontal cross-section at the narrowest portion of the heel. The dowel-lifts are more preferably used on heeled shoes which are less than 0.57 sq. in., and most preferably less than 0.26 sq. in., at that cross section of the heel.

While the preferred embodiments of the invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and the scope of the invention.

What is claimed is:

1. A shoe comprising a heel with a wear-resistant, non-slip dowel-lift, said dowel-lift comprising a dowel and a unitary dual hardness polyurethane material having two portions, a first portion having a Shore A Hardness not less than 96 which adheres to said dowel and second portion of a thermoset polyurethane elastomer having a Shore A Hardness between 81 and 93, a rebound resilience of greater than 40% and an NBS abrasion resistance of greater than 350, said second portion molded to and directly adhering to said first portion wherein said second portion is not greater than 2.5 millimeters in vertical height and wherein said second portion has a bottom surface adapted for contacting a walking surface when said shoe is in normal use.

2. The shoe of claim 1 wherein said first portion possesses a Shore A Hardness value of at least 4 greater than said second portion.

3. The shore of claim 1 wherein said second portion is a thermoset polyurethane elastomer.

4. The shoe of claim 1 wherein said second portion is not greater than 2.5 millimeters in vertical height.

5. The shoe of claim 1 wherein said heel is not less that 2 inches in height.

6. The shoe of claim 8 wherein said horizontal cross-section is less than 0.26 square inches.

7. A unitary dual hardness dowel lift comprising a dowel, a first polyurethane portion formed by molding a first polyurethane material onto an end of said dowel and a second polyurethane portion formed by casting a second polyurethane material onto one surface of said first portion before said first portion has completely cured thus providing interspersion of at least a part of the first material and second material wherein said second material possesses an ultimate Shore A Hardness which is lower than the ultimate Shore A Hardness of said first material.

8. The shoe of one of claims 1, 2, 3, 4, or 5 wherein said heel has a horizontal cross-section and the horizontal cross-section of said heel at its narrowest point is not greater than 1.0 square inches.

9. The unitary dual hardness dowel lift of claim 7 wherein said first portion possesses a Short A Hardness value of at least 4 greater than said second portion.

10. The unitary dual hardness dowel lift of claim 7 wherein second portion possesses a Short A Hardness less than 96.

11. The unitary dual hardness dowel lift of claim 7 wherein said second portion possesses a Short A Hardness between 81 and 93 and said first portion possesses a Short A Hardness not less than 96.

12. The unitary dual hardness dowel lift of claim 7 wherein said second portion is a thermoset polyurethane elastomer.

13. The unitary dual hardness dowel lift of one of claims 7, 9, 10, 11, or 12 wherein said second portion is not greater than 2.5 milliliters in vertical height.

14. A shoe comprising a heel with unitary dual hardness dowel lift said dowel lift comprising a dowel, a first polyurethane portion formed by molding a first polyurethane material onto an end of said dowel and a second polyurethane portion formed by casting a second polyurethane material onto one surface of said first portion before said first portion has completely cured thus providing interspersion of at least a part of the first material and second material wherein said second material possesses an ultimate Shore A Hardness which is lower than the ultimate Shore A Hardness of said first material.

15. The shoe of claim 14 wherein said first portion possesses an ultimate Shore A Hardness value of at least 4 greater than said second portion.

16. The shoe of claim 14 wherein said second portion possesses an ultimate Shore A Hardness value less than 96.

17. The shoe of claim 14 wherein said second portion possesses an ultimate Shore A Hardness between 81 and 93 and said first portion possesses an ultimate Shore A Hardness not less than 96.

18. The shoe of claim 14 wherein said second portion is a thermoset polyurethane elastomer.

19. The shoe of claim 14 wherein said second portion is not greater than 2.5 millimeters in vertical height.

20. The shoe of claim 14 wherein said heel is not less than 2 inches in height.

21. The shoe of one of claims 14–20 wherein said heel has a horizontal cross-section and said horizontal cross-section of said heel at its narrowest part is not greater than 1.0 square inches.

22. The shoe of claim 21 wherein said horizontal cross section is less than 0.26 square inches.

* * * * *